United States Patent [19]

Wahl

[11] 4,286,262
[45] Aug. 25, 1981

[54] ELECTRONIC TRANSMITTER DEVICE

[75] Inventor: John F. Wahl, Sterling, Ill.

[73] Assignee: Mallard Manufacturing Corporation, Sterling, Ill.

[21] Appl. No.: 609,388

[22] Filed: Sep. 2, 1975

[51] Int. Cl.³ .............................................. H04B 7/00
[52] U.S. Cl. .................................. 340/694; 340/696; 49/25; 455/95; 455/99; 455/128
[58] Field of Search ................ 343/225, 228; 325/111, 325/117, 119, 102, 37, 64, 185, 66; 339/183, 147, 176 R; 200/51.09; 219/267, 266, 265; 49/25; 340/694–696, 539; 455/95, 99, 128, 127

[56] References Cited

U.S. PATENT DOCUMENTS

| | | | |
|---|---|---|---|
| 2,588,879 | 3/1952 | Richards | 343/225 |
| 3,270,284 | 8/1966 | Schanbacher | 325/111 |
| 3,364,427 | 1/1968 | Bennett | 325/117 |
| 3,433,928 | 3/1969 | Horwitt | 219/267 |
| 3,467,796 | 9/1969 | Grober | 200/51.09 |
| 3,662,153 | 5/1972 | Barnes | 219/267 |
| 3,865,463 | 2/1975 | Busch | 200/51.09 |
| 3,936,833 | 2/1976 | Bush | 343/225 |
| 3,939,421 | 2/1976 | Barringer et al. | 325/133 |

Primary Examiner—John W. Caldwell, Sr.
Assistant Examiner—Donnie L. Crosland
Attorney, Agent, or Firm—Carl C. Batz; Edmond T. Patnaude

[57] ABSTRACT

A system for opening garage doors in which a radio receiver in the garage, upon receipt of a signal, operates to open the garage door and in which a casing containing a radio transmitter is adapted for insertion into the socket of a cigarette lighter in the driver's compartment of a motor car. Switch means are provided for connecting this transmitter with a source of electrical power to actuate the transmitter and emit a radio signal at a frequency to which the receiver is receptive when the casing is inserted into the socket. The invention also contemplates a radio transmitting device in which a casing containing a radio transmitter is insertable into a socket of any type at any location together with means for energizing the transmitter to emit a signal when the casing has been inserted in the socket, for whatever purpose the signal may be utilized. Further, the invention may provide means for connecting the transmitter to electrical power when inserted into a socket to a predetermined position and means for urging the casing out of the position in which the transmitter is energized when the casing is not being pressed toward this position.

18 Claims, 9 Drawing Figures

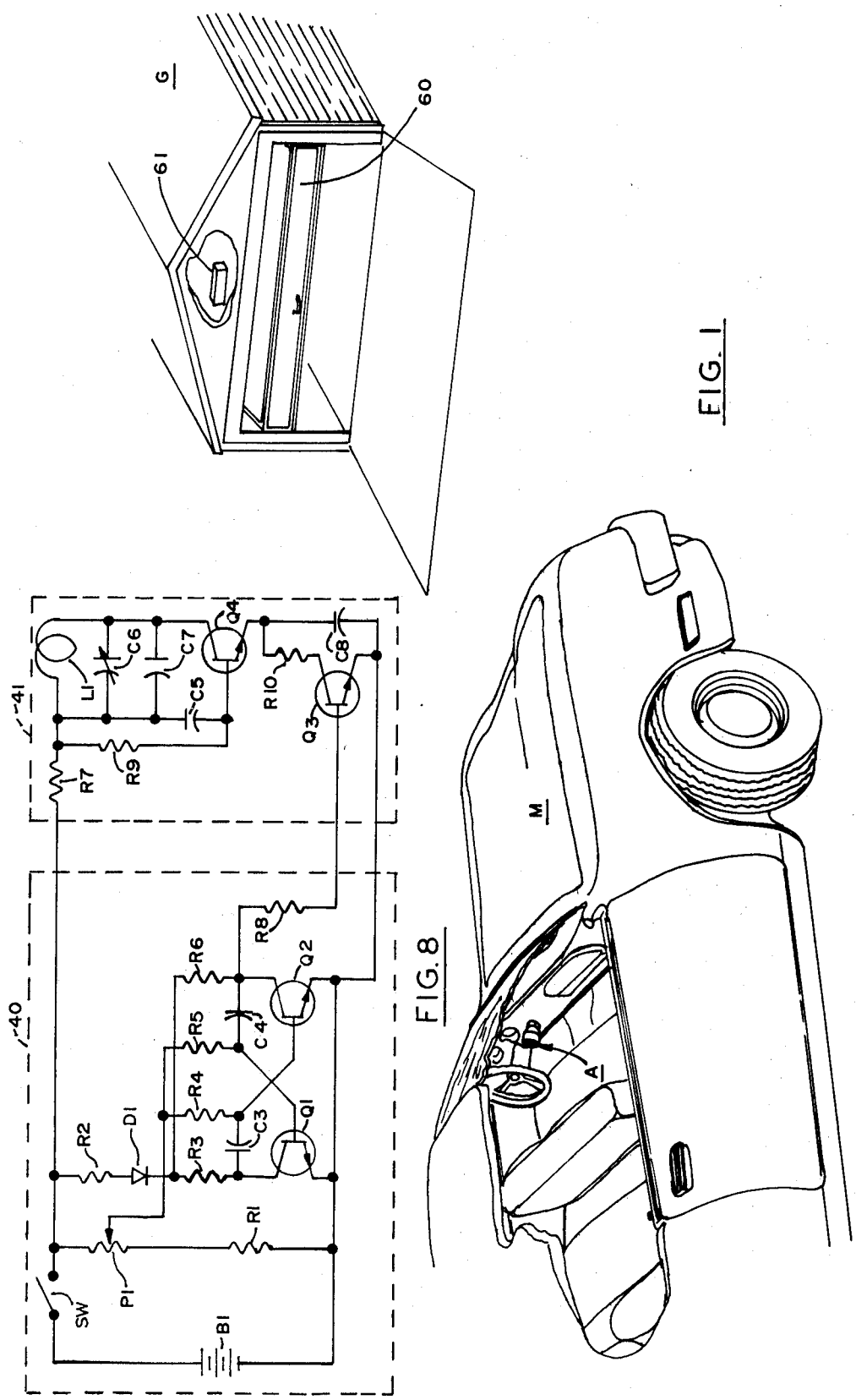

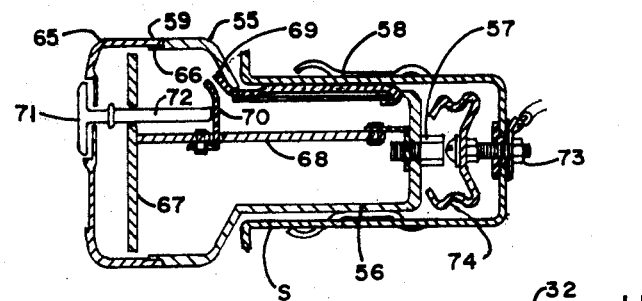
FIG. 9
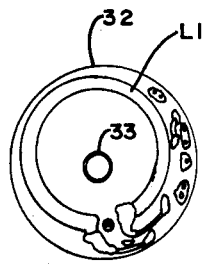
FIG. 3
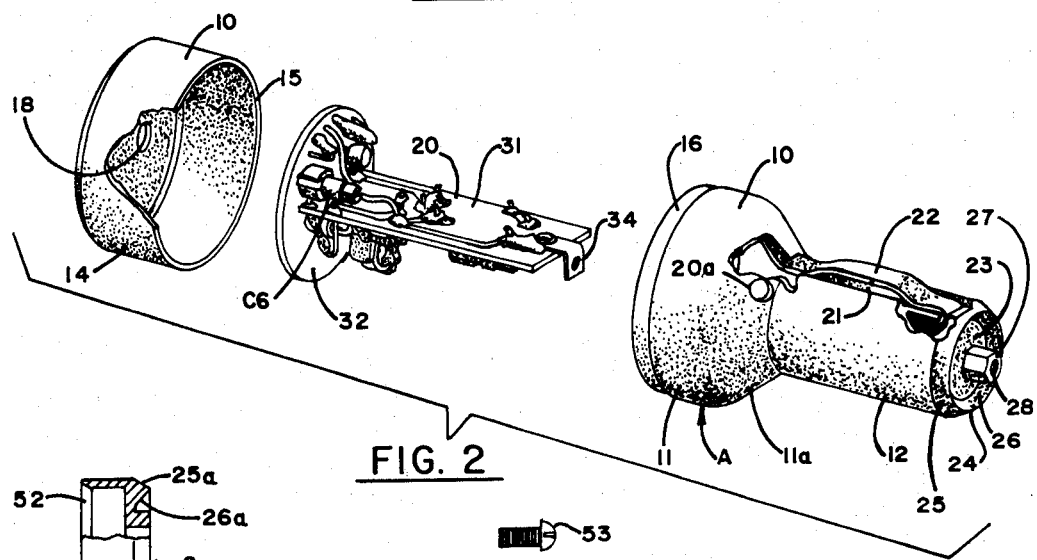
FIG. 2
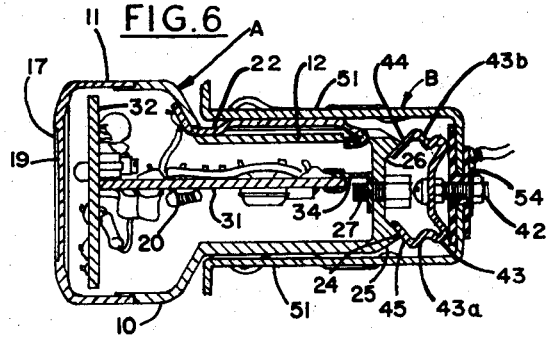
FIG. 6  FIG. 7
FIG. 4
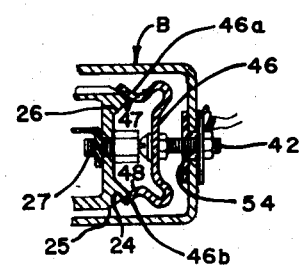
FIG. 5

ELECTRONIC TRANSMITTER DEVICE

This invention pertains to an electronic transmitting device and more particularly to such a device located in the passenger compartment of an automobile and forming a part of the system for opening and closing a garage door. More specifically the device is one of special form in which a casing containing the transmitter is adapted to be inserted into a socket such as is commonly provided in the driver's compartment of an automobile for the purpose of lighting cigars or cigarettes.

BACKGROUND OF THE INVENTION

For opening and closing garage doors it is usual to provide a mechanical door opener of some type which is powered by an electric motor. A receiving device is installed in the garage and a transmitter located somewhere in the driver's compartment of the automobile. The transmitting device may, for convenience, be mounted on the steering column, on the sun visor, or may be kept loose in the glove compartment of the car or may be kept at any other convenient location. To operate such a system, the driver may press a button on the transmitting device causing the transmitter to emit a radio signal of some predetermined frequency. The receiver in the garage, being tuned to this frequency, is activated, and, through suitable relays, activates the motor to open the garage door.

The transmitter, whether mounted on the steering column of the car or carried loose in the car, is powered by a battery for this purpose which is contained with the transmitter in a casing. These batteries have a limited life and have to be replaced periodically.

It is customary that passenger automobiles be provided with electric lighters for cigars or cigarettes and such a lighter is placed in the drivers compartment of the automobile, usually being mounted on the dashboard of the car. These devices include a socket the walls of which are electrically connected to the negative side of the automobile battery, and a contact within the socket which is electrically connected with the positive side of the battery. In these devices a plug is arranged to be pushed into the socket and into engagement with the contact and so energize a heating element which the driver may remove and use for the purpose of lighting a cigarette.

However, many drivers do not smoke, or choose to light their cigars or cigarettes by other means, and electric lighters in their cars are frequently unused.

SUMMARY

I conceived the idea of a radio transmitter device in a system for opening and closing garage doors which is arranged and constructed so that it may be inserted into a socket of the type normally provided for the cigarette lighter and which can be energized from the automobile battery system when inserted into the socket to cause the transmitter to emit a radio signal which will result in the opening, or the closing, of the garage door. My transmitting device includes a casing which contains a transmitter therein and which has a portion which can be inserted into a socket such as the socket of an automobile cigarette lighter and in which position may be connected to an electrical power source and can be caused to emit a signal.

My transmitter device will operate to transmit a signal only when its casing has been pressed into the socket to a predetermined position. In one embodiment switch means automatically connects the transmitter with the power source when this position is reached and moves the casing from this position to disconnect the power source when pressure is relieved; and in another embodiment the switch means includes a manually operable switch which when the casing is in this position can operate to connect and disconnect the transmitter.

The improved device has the advantages of a permanent, built in transmitter, reduced size and weight and the elimination of the need for batteries or to maintain the device by replacement of batteries. The use of a socket allows the transmitter device to be easily installed in new or exchanged autos thus enabling the device to be used over a long period of years and in many different autos.

DRAWINGS

Certain embodiments of the improved device are illustrated in the accompanying drawings in which FIG. 1 is a schematic view in perspective of a garage and of an automobile containing my improved transmitting device after the transmitter has been activated and the garage door has started to open;

FIG. 2 is a perspective view of the transmitting device, the casing being open and the transmitter being shown apart from its casing;

FIG. 3 is a view of the disc-like circuit board, the view being taken from the rear, showing the antenna thereon;

FIG. 4 is a longitudinal sectional view of the socket and casing with the transmitter contained therein, the casing being at the position at which the transmitter is energized;

FIG. 5 is a fragmentary view showing the end of the casing in its position for energizing the transmitter but with a modified means for controlling the positioning of the casing;

FIG. 6 is a detail view partly in section of an extension to the end of the casing;

FIG. 7 is a view of the bolt for fastening the extension;

FIG. 8 is a diagram of a circuit which may be used in the transmitter; and

FIG. 9, is a longitudinal sectional view in some respects similar to FIG. 4 but showing another modification of the invention.

As illustrated, one embodiment of the improved transmitting device A includes a casing 10 which may be formed of plastic material and is shown more clearly in FIGS. 2 and 4. Casing 10 has a head portion 11 of larger diameter and a neck portion 12 which is cylindrical and smaller in diameter. The hollow of the casing extends within both portions and the transmitter 20 is contained within the hollow of the casing. The transmitter is mounted on two circuit boards, one of which is the elongated longitudinally extending board 31 which extends into the hollow of casing portion 12 and the other of which is the disc-like circular boards 32 which extends transversely of the casing axis and within the hollow of the casing portion 11.

As shown in FIG. 2, the larger or head portion 11 of the casing has a cap 14 and the edges 15 of this cap fit tightly over the rim 16 to close the casing. At its rearward end, the cap 14 is provided with a circular depression 17 into which a circular label 19 may be inserted. The rear wall of the cap has an opening 18 which preferably registers with a transparent portion of a label 19, the purpose of which will become apparent later in this description.

The forward wall 11a of the head 11 of the casing is frusto-conical in form and joins with the wall of the neck portion 12. Wall 11a is provided with an opening 20a through which tuning adjustments may be made.

As previously indicated, the neck portion 12 of the casing is cylindrical in form. It has a longitudinal slot 21 in its surface and the metallic spring 22, which is disposed in this slot, makes electrical contact with the walls of the socket. At the front of the casing is the transverse end wall 23. On the front side of the end wall 23 is a circular ridge 24 which has the inclined outer surface 25 and the inclined inner surface 26. A metallic bolt 27 extends through an opening in the end 23 and has a tapped hole 28 in its head.

Referring now more particularly to the transmitter, attention is drawn to FIG. 2 where the physical appearance of the transmitter is indicated and to FIG. 8 which shows a circuit diagram. In the diagram, Q1, Q2 and Q3 are T-type base transistors; R1, R2, R3, R4, R5, R6, R7, R8, R9, and R10 are resistors; P1 is a potentiometer; C3 and C4 are tone capacitors; C5, C6, C7 and C8 are capacitors; D1 is a light emitting diode; L1 is a single loop inductance coil in arcuate form which constitutes the radiating antenna; and B1 is a battery which may be the automobile battery which powers the starter and ignition functions.

As previously mentioned there are two circuit boards, the rectangular elongated circuit board 31 which carries the modulating audio frequency circuit and extends into the neck portion 12 of casing 10, and the circular disc-like boards 32 which carries the radio frequency oscillating circuit. The dotted line 40 of FIG. 8 encompasses circuit elements which are mounted on circuit board 31 and the dotted line 41 of FIG. 8 encloses circuit elements which are mounted on circuit board 32.

As shown more clearly in FIG. 3, the antenna is in arcuate form but not necessarily concentric with the circuit board 32 on which it is mounted. The form of the antenna may vary but the arcuate form makes effective use of space on the disc-like board.

The circuit board 32 contains the opening 33 not necessarily in the center of the board, but as here shown at a location which is embraced by the arcuate antenna. The opening 33 registers with the opening 18 in cap 14 and also with the light emitting diode D1 which is carried by the board 31 and arranged to extend into opening 33 of board 32 or at least to register with openings 33 and 18, so as to give a light signal outside casing 10 indicating that the transmitter is in operation.

As shown particularly in FIGS. 2 and 8, the circuit contains the adjustable capacitor C6 which is mounted on the forward side of board 32 and is adjustable to control the radio frequency tuning of the circuit. The opening 20 in the wall 11a of the casing is in line with the capacitor C6 and without opening the casing the final tuning of the circuit may be done by extending a screwdriver through opening 20 to the capacitor C6 and turning the capacitor adjustment in one or another direction as may be necessary.

As shown in FIG. 2 the transmitter device is in three main parts and to assemble these parts the transmitter, including circuit boards 31 and 32, is inserted into the neck portion 12 of the casing. The board 31 slides through the hollow of portion 12 and the bracket 34 engages the bolt 27 which is the positive side of battery B1 (FIG. 8), and the spring 22 is connected in the circuit to the negative side of battery B1.

With the transmitter so inserted into casing portion 12 and the adjustable capacitor C6 aligned with opening 20a the cap 14 is placed over the circuit board 32 so that its opening 18 is aligned with the opening 33 and diode D1 and with its edge 15 tightly engaging rim 16.

It is important that the loop antenna be located in the head portion of the casing since the antenna should be free of the metal socket to radiate the RF signal effectively. However, the audio modulating circuit mounted on board 31 may be contained in the neck portion of the casing which is inserted into the socket because the metal socket has no effect on this circuit.

With the board 32 carrying the loop antenna in a plane perpendicular to board 31 the loop antenna is in the preferred orientation with respect to the automobile and the door opening receiver. The transmitter has a stronger radiating signal in a direction perpendicular to the plane of the loop antenna. When the cigarette lighter sockets are installed in the dash the signal is found to be strongest when the auto is pointing at the receiver nromally mounted just inside the door.

The relationship of the transmitter device with a socket such as is commonly found in the drivers compartment of an automobile for use as a cigarette lighter, is more clearly illustrated in FIGS. 4 and 5. The socket B is of a type commonly used for cigarette lighters. It has cylindrical walls 51 and an end wall 52. As shown, the plug element used for lighting cigarettes has been removed and the casing, which contains the transmitter, has been inserted into the socket. As the neck portion 12 of the casing moves into the socket the spring 22 is depressed and gives assurance that there is good electrical contact between the socket walls and the negative side of the transmitter circuit. The circuit walls are electrically connected with the frame and to the negative side of the automobile battery.

Contained in socket B at its forward end is a spring member 43 having arms 43a and 43b. Bolt 42 extends through the center part of springs 43, through the insulator 54 and through the end of the socket to bind the spring 43 in place. Bolt 42 is electrically connected to springs 43 and 46 and to the positive side of the car battery, but is insulated from the socket. The head of bolt 42 serves as a contact point which, when engaged by the bolt 27 of the transmitter device energizes the transmitter causing it to emit a radio signal.

As the casing 10 is pressed forwardly to cause the bolt 27 to approach the bolt 42, the inner inclined surface 26 of ridge 24 engages the inclined surface 44 of spring arm 43b and engages also the inclined surface 45 of spring arm 43a, pressing arms 43a and 43b toward each other and bringing them under tension. It will be understood that spring 43 resists this movement and continues to resiliently urge the casing in a rearward direction. Any furthwer forward movement of the casing is prevented when the casing reaches the position in which the bolts 27 and 42 come into contact and the transmitter is energized. However, when the pressure tending to move the casing forward is relieved, the spring 43 moves the casing back to break the electrical contact between bolts 27 and 42, and to move the casing to a position where it is still carried in the socket but in which the transmitter circuit is not energized. From this inoperative position, the casing may again be pressed forward manually against the tension of spring 43 into the predetermined position in which the transmitter is energized.

FIG. 5 shows a modified type of spring which urges the casing rearwardly to its inoperative position in which the contacts for energizing the transmitter are not made. In this modification the spring 46 is held by the bolt 42 and has arms 46a and 46b. As the casing 10 is being pressed forwardly, the outer inclined surface 25 of ridge 24 comes into contact with the inclined surface 47 of arm 46a and with the inclined surface 48 of arm 46b, so as to spread spring arms 46a and 46b apart, thus bringing them into tension and causing them to resiliently urge the casing back to a position in which the casing is carried by the socket but in which the transmitter is not energized.

The springs of FIGS. 4 and 5 each constitute resilient means for urging the casing back to a position in which the transmitter is not energized. Other resilient means may be substituted for these specific structures.

When it is desired to use my transmitter device with a socket which happens to be deeper than usual, I provide an accessory to adjust for the deeper socket. This is shown particularly in FIGS. 6 and 7. The piece C which may be made of plastic material and of the same cylindrical diameter as neck portion 12, has an inclined annular surface 52 which fits over the outer inclined surface 25 of the ridge 24 at the end of the neck portion 12, and the bolt 53 (FIG. 7) extends through an opening at the front end of the piece C and engages the tapped hole 28 of the bolt 27. In this way, the neck portion 12 may be extended, and the new surface 25a engages the surfaces 47 and 48 of spring arms 46a and 46b; or the new surface 26a engages the surfaces 44 or 45 of spring arms 43a and 43b. At the same time, electrical connection is made between bolts 27 and 53.

The operation of my improved transmitting device may best be explained with reference to FIG. 1 wherein the garage has the door 60 and is equipped with a mechanical door opening device and a radio receiver 61 which is responsive to a radio signal of a predetermined frequency to start the mechanical door opening device into operation either for opening the door or for closing it.

Preferably, the receiver 61 is built to provide a time delay between the instant it first receives a signal and the time that it operates to start the door opening mechanism in operation. This delay may be something like ½ second in duration. This delay tends to avoid "Phantom" starts and requires the operator to positively hold the device in an energizing position for a short time in order to start the mechanism.

In the dash of the motor car M is a cigarette lighter from which the lighter plug has been removed and the neck of my transmitting device inserted. The transmitting device has been inserted into a position in which it may be carried in the socket but not so far as to cause the transmitter to be energized. When the driver wishes the garage door to be opened, he presses on the rear end of casing 10 with his finger or thumb moving the casing forwardly as far as it will go in which position contact is made to apply voltage from the car battery to the transmitter thus energizing the circuit and causing the transmitter to emit via antenna L1 a radio signal to which receiver 61 is responsive and so causing the door 60 to be opened. When the transmitter is so energized the diode D1 lights and projects light through openings 33 and 18 which gives assurance to the driver that a signal is being transmitted.

When the diode D1 has remained lighted for a brief time the driver may remove his finger or thumb from the casing 10 at which time the spring 43 or spring 46 may operate to move the casing rearwardly to a position in which the transmitter is not connected with a source of electrical potential, and at this time the light from diode D1 goes out. The driver may let the transmitting device remain at an inoperative position within the socket B until the next time he wishes to open or close the garage door or he may remove the device A and carry it in his pocket or purse, again replacing it in the socket when he returns to his car or when he next wishes to use it for opening or closing the garage door.

In the embodiment above described switch means are provided which automatically energize the transmitter when the neck portion of the casing has been pressed into the socket to the predetermined position in which the bolt 27 contacts bolt 42. In this embodiment the switch means includes resilient means for moving the casing out of such position to deenergize the transmitter when the pressure is removed.

I will now explain the structure and operation of another embodiment in which the casing may be pressed into the socket to a predetermined position and left in this position and in which the switch means includes a manual switch for turning the transmitter on and off when the casing is in this position. This latter embodiment is illustrated more particularly in FIG. 9 of the drawing.

The modification of my device shown in FIG. 9 includes the casing 55 having the neck portion 56 having a plain forward end through which the bolt 57 extends. The neck portion has the spring 58 which extends in a longitudinal slot in the side of portion 56 similar to that of the previously described embodiments.

The head portion 59 of the casing includes the cap 65, the edge of which fits over the brim 66. Enclosed within the head portion is the disc-like circuit board 67 which extends transversely to the axis of the casing, and the longitudinal circuit board 68 extends forwardly into neck portion 56. The circuit units mounted on boards 67 and 68 are not shown in FIG. 9 in order to avoid confusion in the drawing.

Contact 69, attached to spring 58 and contact member 70, mounted on board 68, provide the contact points of a switch. A button 71 is on the end of the cap 65 and the plunger 72 which extends through an opening in board 67, has its one rear end attached to bottom 71 and its forward end abutting the member 70. Member 70 has the character of a spring, and when the button 65 is pushed the plunger operates to press the contact member 70 against contact 69, thus closing the switch, and when pressure against button 65 is relieved the contacts 69 and 70 come apart thus opening the switch.

In this modification, the socket S has the bolt 73 which is connected to the positive side of the battery and with which the bolt 57 makes contact when the neck of the casing is pressed into the socket. In this modification the spring 74 may or may not be contained in the socket but it need not be used for the purpose of urging the casing away from the predetermined position in which contact between bolts 57 and 73 is made.

In the operation of the device as represented in FIG. 9, the driver of the car may push the casing to cause the neck portion of the casing to be inserted into the socket. Advantageously, this may be done by pressing the button 71. This brings the casing to the position in which bolt 57 contacts bolt 73, and also while pressure is applied to the button 71 the contacts 69 and 70 will be closed. Both contacts 69-70 and 57-73 must be made before the transmitter is energized to transmit a signal.

When a short time has passed and operation of the garage door is started the driver may release pressure from button 71 which breaks the power connection through separation of contacts 69-70. In this modification the casing may remain in its predetermined position in which bolts 57 and 73 are in contact, and later when the garage door is again to be operated the driver may simply depress button 71 to transmit another signal. It may be noted that pressure against button 71 also operates to keep bolts 57 and 73 in definite contact. We may regard the structure by which the contacts 69-70 and 57-73 are opened and closed as forming switch means by which the transmitter is connected and disconnected from its power source.

In the above described embodiments it is contemplated that the socket is mounted in the drivers compartment of an automobile. It is also feasible that a separate portable socket be provided with a small battery. The socket, the battery, and the casing containing the transmitter then provides a portable device which may be utilized to open and close garage doors or perform other functions through radio control.

While I have described the improved transmitting device for use in a socket normally provided for cigarette lighter use, and have described the improved device as being for the purpose of opening a garage door, it is understood that my device may be utilized for performing other functions, and while it is advantageous that the device be utilized in cigarette lighter sockets and be powered by the automobile battery which is also used to operate the starter or the engine, it is understood that a separate and different socket may be utilized or that a different or independent battery may be provided for furnishing the electrical potential.

Also, it is understood that although I have described my improved device and a system for performing a mechanical function as it appears in certain selected embodiments, it will be apparent to those skilled in this art that many embodiments may be constructed and many changes may be made all within the spirit of the invention and the scope of the appended claims.

What is claimed is:

1. In a system for opening a garage door which includes a radio receiver responsive to a selected radio frequency, means actuated by said receiver for opening said door, and means for transmitting a radio signal of said frequency, the improvement in which said transmitting means includes a socket, a casing having a portion thereof which is insertable into said socket, a transmitter contained within said casing and tuned to said frequency, and means automatically operable when said portion is inserted to a predetermined position within said socket for energizing said transmitter.

2. An electronic transmitting device comprising a socket, a casing having a portion which is extendable into said socket, a source of electrical potential outside said casing, an electronic transmitter contained within said casing, and means for automatically connecting said transmitter with said source when said portion is moved to a predetermined position within said socket to energize said transmitter and transmit a signal.

3. A device as set forth in claim 2 in which said socket has cylindrical walls, an open end and a closed end, and in which one side of said source is electrically connected with said walls and the other side of said source is electrically connected with a contact point in said socket and including means for electrically connecting said walls with said point through said transmitter when said portion is extended into said socket to said predetermined position.

4. A device as set forth in claim 2 including resilient means for urging said casing portion against movement into said predetermined position, said resilient means being yieldable to pressure applied against said casing toward said position but effective to move said casing from said position when said pressure is relieved.

5. A device as set forth in claim 4 in which said resilient means includes a spring mounted on the interior of said socket and in which said casing portion has an inclined surface which makes contact with and brings said spring under stress when said portion is moved to said position.

6. A device as set forth in claim 5 in which said portion has on its forward end a circular ridge and said inclined surface is on one side of said ridge.

7. A device as set forth in claim 6 in which said surface is on the outside of said ridge and wherein said springs have arms which are contacted by said surface and moved apart as said portion is moved into said position.

8. A device as set forth in claim 6 in which said surface is on the inside of said ridge and wherein said springs have arms which are contacted by said surface and moved together as said portion is moved into said position.

9. A device as set forth in claim 2 wherein said casing is cylindrical and said transmitter includes a circuit board in circular form and an antenna in arcuate form on said board.

10. A device as set forth in claim 2 wherein said casing has an area thereof capable of transmitting light therethrough and a lamp within said casing and connected in said transmitter so as to transmit light through said area when said transmitter is in operation.

11. A device as set forth in claim 2 in which said transmitter contains a unit which is adjustable for the purpose of tuning the transmitter to different frequencies and wherein said casing has an opening in register with said unit which permits insertion of a tool through said opening into engagement with said unit.

12. A system as set forth in claim 1 which includes resilient means within said socket for urging said casing from said position but which is yieldable to permit insertion of said casing to said position where pressure is applied, said means being operable to move said casing from said position when said pressure is relieved.

13. A system as set forth in claim 1 which includes the battery which powers the electrical system of the automobile as a power source for said transmitter.

14. A device as set forth in claim 2 in which said switch means includes an electrical conducting element extending into said casing, and including an extension piece having the same outer dimension as said casing portion and a second electrical conducting element extending through said piece, and being engaged with said first mentioned element said second element constituting means for securing said piece to said casing and for bringing said second element into electrical contact with said first mentioned element.

15. A device as set forth in claim 2 in which said means includes a pair of electrical contacts which are brought together when said casing is moved to said predetermined position and also a switch which is manually operable when said contacts are together to connect said transmitter with said source.

16. A device as set forth in claim 14 in which said switch is spring biased toward "off" position but which is manually movable against the said spring bias to "on" position.

17. A device as set forth in claim 15 in which said switch is located at the rearward end of said casing whereby said switch may be manually moved to "on" position at the same time said casing is pressed to move it into said socket.

18. A device as set forth in claim 10 wherein said casing is cylindrical and which includes a circular circuit board having thereon an arcuate antenna, said board having an opening within the arc of said antenna, said lamp being disposed in said opening.

* * * * *